UNITED STATES PATENT OFFICE.

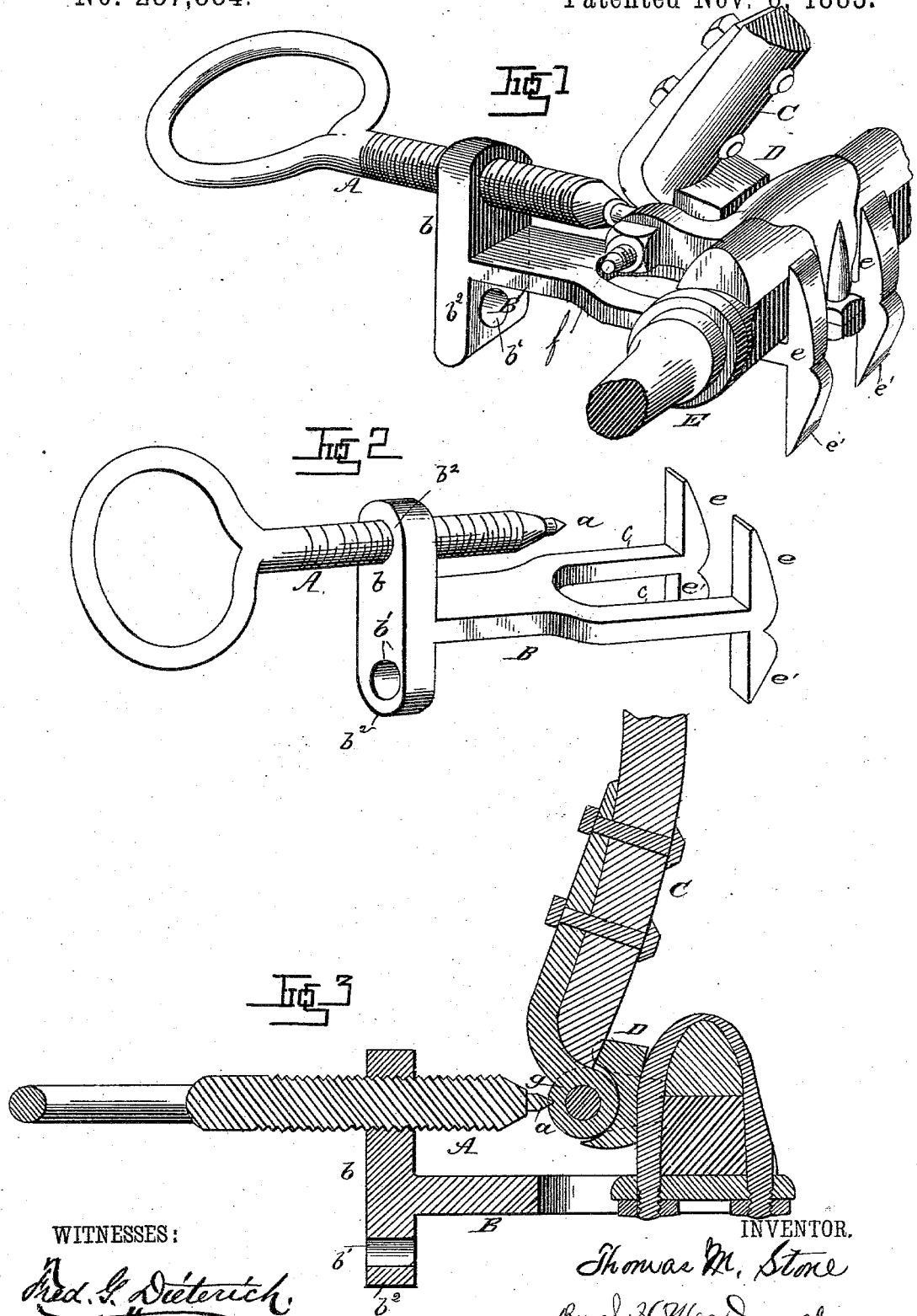

THOMAS M. STONE, OF MUTUAL, OHIO.

THILL-COUPLING JACK.

SPECIFICATION forming part of Letters Patent No. 287,884, dated November 6, 1883.

Application filed July 31, 1883. (No model.)

*To all whom it may concern:*

Be it known that I, THOMAS M. STONE, a citizen of the United States, residing at Mutual, in the county of Champaign and State of Ohio, have invented certain new and useful Improvements in Thill-Coupling Jacks, of which the following is a specification, reference being had therein to the accompanying drawings.

My invention relates to means for pressing the rubber packing or "anti-rattler" packing into place in vehicles.

To this end my invention consists in a metallic frame or brace having screw-threaded openings in a bar at one end and clamping projections at the opposite end all of which will be hereinafter more fully set forth in the specification, and pointed out in the accompanying drawings, in which—

Figure 1 is a perspective view of my device attached to a vehicle-spring and shaft-coupling. Fig. 2 is a detail perspective view of the device, and Fig. 3 a longitudinal section of Fig. 1.

Referring more particularly to the drawings, A represents a screw, the point $a$ being of chilled metal. This screw A passes through one of the openings, $b'$, in the arms $b$ of the plate B. This plate is made with two legs or branches, $c$, having the projections $e$ $e'$, for grasping the axle of the vehicle.

The device is used as follows: When it is desired to insert a new rubber or anti-rattler, D, the plate or bar B is placed as shown in Fig. 1, the projections $e$ $e'$ grasping the axle. The rubber D having been inserted behind the shaft-eye $g$, there is a difficulty experienced in forcing back the shaft-eye in order that the bolt can pass through the shaft-eye. The bolt A is screwed up against the shaft-eye, the point $a$ pressing against said eye, and presses up the rubber so that the bolt $f$ can be readily inserted. This holds up the shafts at the same time that the rubber is being compressed. The arms $b^2$ $b^2$ are of unequal length, the difference being about the depth of one of the openings $b'$. The object of this is to enable the device to be used on larger or smaller axles—such, for instance, as light buggies—and again on spring-wagons and road-wagons. The screw A is made of cast or malleable iron. with the point $a$ chilled or hardened, so as to prevent wearing. The bar or plate B, with the arms $b$ $b^2$, legs $c$, and projections $e$ $e'$, are all cast or made in one piece.

It will be observed that the projections $e$ $e'$ are placed squarely against the axle, and if necessary a piece of cloth or other fabric is placed between the arms and axle, so as to prevent the paint becoming worn or rubbed. As the point $a$ impinges on a single spot on the eye $g$, the shaft does not become marred or defaced.

I am aware that a shackle-jack has been used which consists of two arms having their rear ends turned up behind the axle, the opposite end being tapered to receive a screw which carries a slide, which presses against the shackle-eye. I am also aware that a clamp for shaft connections has been made which has a stock, to which two adjustable jaws are secured, and a set-screw passing through the stock at the opposite end from the jaws, said jaws being adapted to grasp the axle. Such forms of construction I do not claim.

Having thus described my invention, what I claim as new, and desire to secure by Letters Patent, is—

A device for compressing anti-rattler packing for shaft-couplings, consisting of a plate, B, having the arms $b^2$, of unequal length, the legs $c$, and gripping projections $e$ $e'$ on each side of the legs, the shaft being held in position by a screw, A, passing through an opening in one of the arms $b^2$.

In testimony whereof I affix my signature in presence of two witnesses.

THOS. M. STONE.

Witnesses:
  I. H. McDONALD,
  JOHN LAFFERTY.